United States Patent [19]

Cable

[11] 4,009,851
[45] Mar. 1, 1977

[54] SPACECRAFT STRUCTURE

[75] Inventor: Walter Lester Cable, Freehold, N.J.
[73] Assignee: RCA Corporation, New York, N.Y.
[22] Filed: Dec. 23, 1974
[21] Appl. No.: 535,810
[52] U.S. Cl. .............................................. 244/158
[51] Int. Cl.² ........................................ B64G 1/10
[58] Field of Search ........... 244/158, 159, 162, 173

[56] References Cited

UNITED STATES PATENTS

| 3,576,298 | 4/1971 | Barnett et al. ..................... 244/162 |
| 3,709,447 | 1/1973 | Devlin .............................. 244/158 |
| 3,817,477 | 6/1974 | Luther et al. ...................... 244/173 |

OTHER PUBLICATIONS

*Fan Beam Navigation Satellite Study*, Philco, WDL Division, Contract No. NASW–1368, WDL–TR2962, vol. V, 7/13/66, Fig. 3–8 (Sheets 1 & 2 of 4).

*Primary Examiner*—Trygve M. Blix
*Assistant Examiner*—Barry L. Kelmachter
*Attorney, Agent, or Firm*—Edward J. Norton; Samuel Cohen; William Squire

[57] ABSTRACT

A spacecraft structure comprises a hollow inner cylindrical member and a plurality of planar bulkheads secured to the outer surface of the inner member and extending radially outwardly from the inner member. A plurality of planar enclosure panels are secured to the extended edges of the bulkheads and each other to form an enclosed spacecraft structure. Suitable payload equipment is secured to the enclosure panels while an apogee kick motor is secured within the inner member.

6 Claims, 10 Drawing Figures

SPACECRAFT STRUCTURE

BACKGROUND OF THE INVENTION

1. Field of Invention

The present invention relates to a structural arrangement in a spacecraft suitable for orbiting about the earth.

2. Description of the Prior Art

Prior art spacecraft generally comprise a planar baseplate structure which is heavily reinfored in order to support the spacecraft engine and payload equipment which depends from and is secured to the baseplate. This arrangement requires a baseplate structure made of reinforced materials which add considerably to the weight of the spacecraft. With the growing need for increased functions of an orbiting spacecraft, any reduction in weight in the structure will permit a corresponding increase in weight in the accompanying payload for which the spacecraft is designed.

Many factors in the design of a structure useful in an orbiting spacecraft are critical. These include alignment of the solar cell arrays, various motors which control the attitude and position of the spacecraft and communications equipment such as antenna, subsystems and sensors used in conjunction with a given mission assigned to a spacecraft.

These requirements necessitate an extremely stiff spacecraft structure. However, relatively large weight is added to the spacecraft in prior art arrangements in order to achieve the stiff configuration.

Summary of the Invention

A spacecraft is provided having an inner hollow cylindrical member which serves to provide structural strength to the spacecraft. A plurality of bulkhead plates depend outwardly from the inner member. An enclosure member is secured to the bulkhead plates and at the ends of the inner member so as to form a plurality of enclosed internal compartments.

A structure is provided that is fully enclosed to protect equipment internal to the spacecraft from the environment while at the same time providing externally removable panels allowing interchangeability of different modulized subsystems and panel combinations to meet a variety of mission requirements. This interchangeability can be accomplished without affecting base structure stiffness or environmental response. Further, the cylindrical inner member permits the use of lighter materials permitting an increase in the weight of the spacecraft payload.

IN THE DRAWINGS

DETAILED DESCRIPTION

Figure 1:
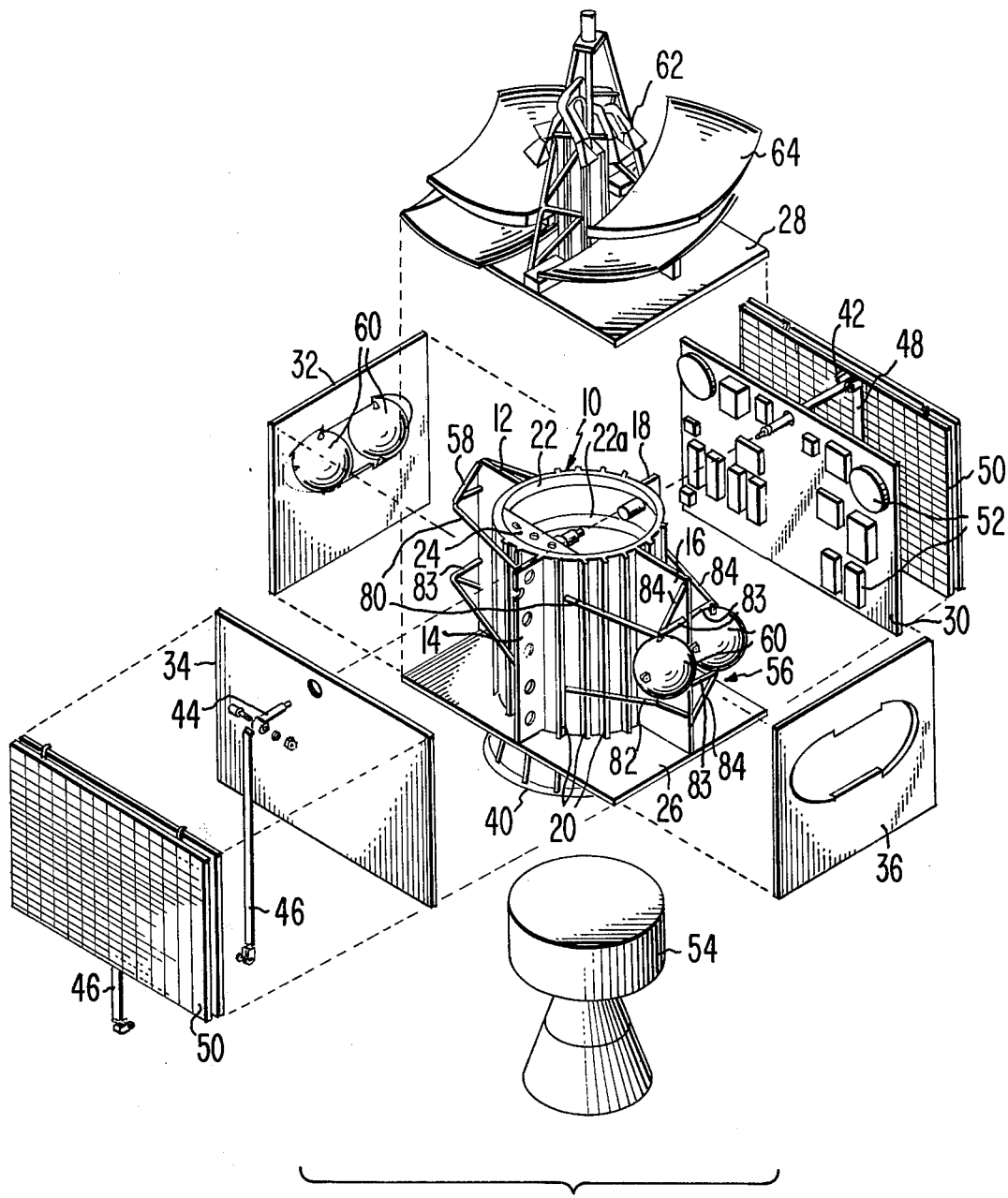
FIG. 1 is an exploded isometric view of an embodiment of the present invention.

In FIG. 1, there is shown an exploded isometric view of a spacecraft built and operated in accordance with the present invention. The spacecraft comprises an inner elongated cylinrical member 10. Member 10 is a monocoque aluminum alloy sheet member that is riveted, welded or otherwise suitably fastened at an edge thereof to form a cylindrical member. Extending the length of cylindrical member 10 are four bulkheads 12, 14, 16 and 18. Each bulkhead is a planar sheet or honeycomb material made of aluminum or other lightweight alloy. Each bulkhead is secured at an edge thereof in a suitable manner to the cylindrical member 10. Bulkheads 12 and 16 depend from member 10 in radial diametriclly opposite directions. Bulkheads 14 and 18 depend from cylindrical member 10 also in radial diametrical opposite directions oriented 90° from the line formed by bulkheads 12 and 16. As a result, the bulkheads 12, 14, 16 and 18, together with cylindircal member 10, form four compartmentalized areas disposed between facing bulkheads.

Cylindrical member 10 is made extremely stiff by a plurality of longitudinally extending ribs 20 spaced in parallel arrangement around the outer periphery of member 10 and a plurality of inner stiffening rings or ribs 22, 22a, and 22b (FIGS. 3a, 3b, 3c) extending around the inner circumference of member 10 transverse the longitudinal axis of member 10 and ribs 20. Secured at the upper end of cylindrical member 10 is solar cell and drive motor support 24. Secured at the lower end of member 10 transverse the longitudinal axis thereof is rectangular planar enclosure member 26. Member 26 has a width defined by the combined respective widths formed by bulkheads 12 and 16 and diameter of member 10 in a first direction. Member 26 has a length defined by the combined respective widths of bulkheads 14 and 18 and diameter of member 10 in a second orthogonal direction. Upper planar enclosure member 28 is disposed at one end of member 10. The dimensions of member 28 are substantially the same as that of member 26. Members 26 and 28 are secured to the bulkheads 12, 14, 16 and 18 at the respective opposite ends of the bulkheads and the respective opposite ends of member 10 by suitable fastening means.

To complete the structure, four longitudinally extending planar enclosure members 30, 32, 34 and 36 are provided. The length and width of members 30 and 34 are each substantially the same, corresponding respectively to the transverse dimension provided by the combined bulkheads 12, 16 and the diameter of inner member 10 and the length of cylindrical member 10 in the longitudinal direction. Closure members 32 and 36 have a length and width defined by the combined widths of bulkheads 14 and 16 and the diameter of inner member 10 in the transverse direction and by the length of cylindrical member 10 in the longitudinal direction, respectively. Each of the members 26, 28, 30, 32, 34 and 36 are secured to the adjacent contiguous bulkheads, each other and member 10, as the case may be, by screws or other suitable fastening means.

Each of the closure members 26 through 36 is made of aluminum honeycomb structure surrounded at the periphery thereof by suitable lightweight aluminum channelized members. A lightweight foil skin encloses the honeycomb structure on both sides of each member. As a result, the spacecraft appears as a box enclosed by members 26 through 36, having a hollow cylindrical core defined by member 10. It is to be understood that the particular materials noted are exemplary.

Secured to the lower end of member 10 is a frustoconical member 40 which is constructed similarly as member 10. The narrow opening of member 40 is substantially the same size as the opening of member 10 and secured adjacent to member 10. As a result, member 40 forms a flared out configuration extending away from the box-like enclosure formed by the enclosure members. The enclosure members 26 through 36 in combination with the bulkheads 12 through 18 and cylindrical inner member 10, together form an extremely stiff, but yet lightweight structure. In addition, solar cell deploying linkages 46 and 48 are connected to shafts 44 and 42, respectively, for deploying conventional solar panels 50 in a well known manner.

Mounted on one of the enclosure plates 30 is a plurality of electronics and other similar payload gear 52. Two protective payload enclosure compartments are formed by bulkhead 18 and member 10 with the enclosure members 26, 28, 30, 32 and 36 for enclosing the payload gear 52. As seen in FIG. 1, enclosure member 30 is not only a part of the structural arrangement for the spacecraft, but also provides support for the payload gear 52. Supported within the hollow of inner cylindrical member 10 is apogee kick motor 54. Structural support for motor 54 is provided by member 10 directly as will be shown later. The mounting of motor 54 within member 10 provides improved stabilization and strength to the structure.

Secured at opposite facing surfaces of member 10 are fuel tank support truss members 56 and 58. As shown in FIG. 1, members 56 support two spherical fuel tanks 60. Similar fuel tanks are also supported by truss members 58.

Secured to enclosure member 28 is a communications antenna 62 including a reflector 64. The loads transmitted by the weight of antenna 62 and reflector 64 are distributed along member 10 in the axial direction. Antenna 62 and reflector 64 comprise some of the more heavy payload arrangements to be secured to the spacecraft. Cylindrical member 10 absorbs these heavier loads without distortion and other physical effects on the spacecraft. That is, the cylindrical member 10 with the bulkheads and the enclosures members together form an extremely rigid enclosure which is substantially unaffected by the heavier concentration of loads produced by the antenna 62 and reflector 64.

Figure 2:
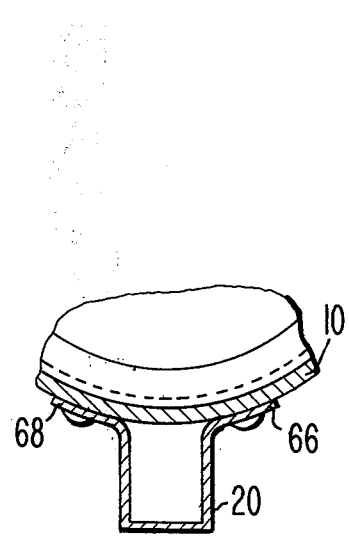
FIG. 2 is a sectional view of a rib in the structure of FIG. 1.

Additional payloads and electronic equipment and gear (not shown) are secured to the various ones of closure members 30, 32, 34 and 36 in accordance with a particular application. FIG. 2 shows a cross section of a typical elongated outer rib 20. Rib 20 of FIG. 2 is an elongated channel member having two axially extending flanges 66 and 68 which are riveted or otherwise suitably fastened to member 10. Ribs 20 are uniformly spaced around the periphery of member 10 intermediate bulkheads 12, 14 16 and 18.

Figure 4:
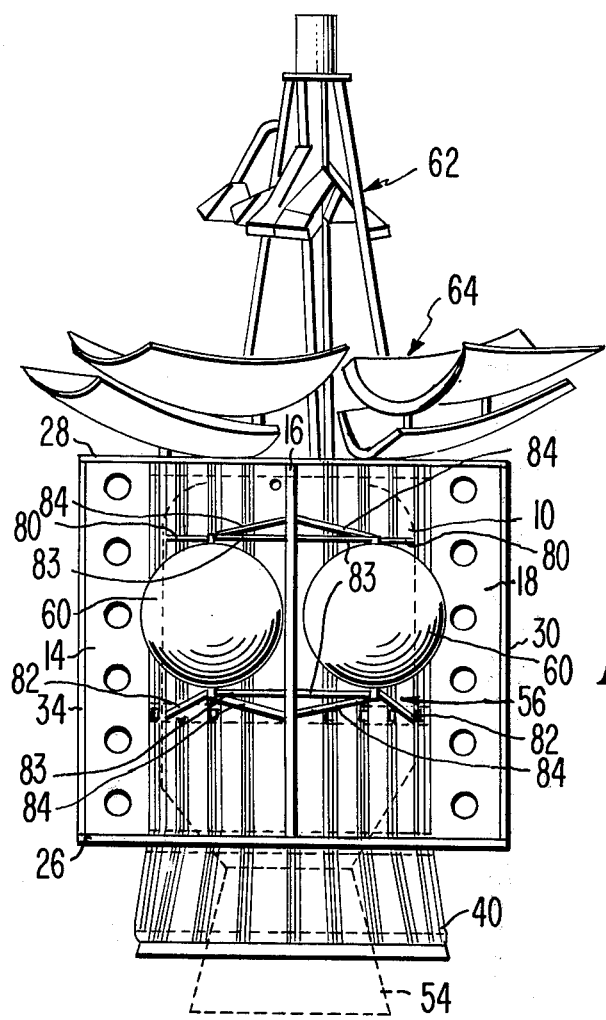
FIGS. 4 and 5 are elevational views of the embodiment of FIG. 1.
Figure 5:
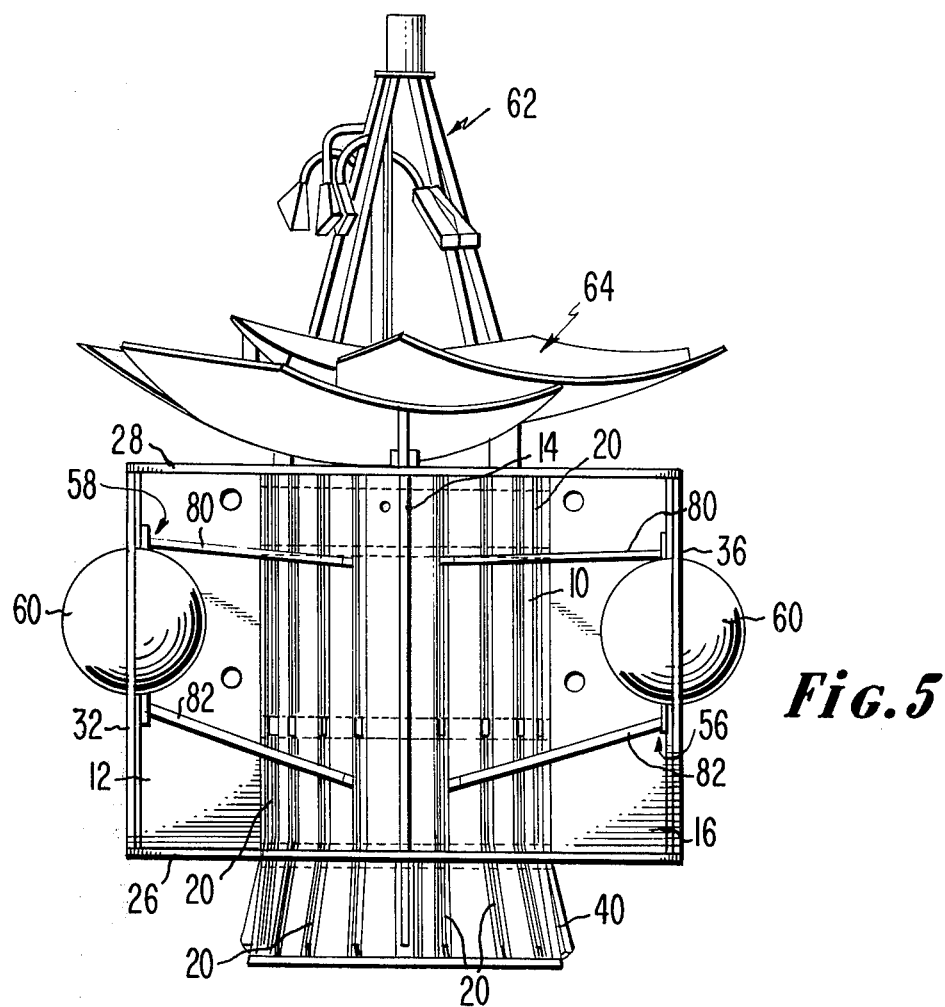
Figure 3A:
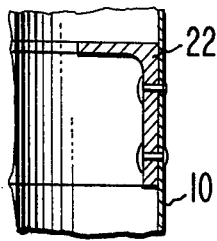
FIGS. 3a, 3b and 3c are sectional views of other reinforcing ribs in the structure of FIG. 1.
Figure 3B:
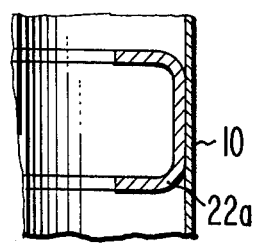
Figure 3C:
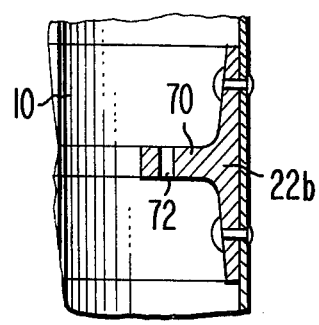

FIG 3a illustrates an enlarged portion of inner rib 22 which is an annular angle made of suitable aluminum alloy and riveted to the inner peripheral surface of member 10. Disposed within the inner hollow of member 10 is a second annular rib 22a spaced longitudinally from rib 22 (FIG. 3b). Rib 22a is a channel member which is rivited to member 10 providing extreme rigidity to the member 10. Other ribs similar to rib 22a are provided along the length of member 10 as needed. Disposed approximately midway along the length of member 10, extending around the inner circumference thereof, is a flange member 22b, FIG. 3c. Flange member 22b has an extra heavy, stiff flange 70 with an apogee kick motor mounting hole 72 disposed therein for supporting apogee kick motor 54. The location of the apogee kick motor is important since the motor comprises about one-half the weight of the satellite. Suitable rib members (not shown) secure the frustro-conical member 40 to the lower end of cylindrical member 10 as seen in FIGS. 4 and 5. In FIG. 4, motor 54 is shown in phantom to show its approximate location within member 10. FIGS. 4 and 5 show the truss members 56 and 58.

Figure 6:
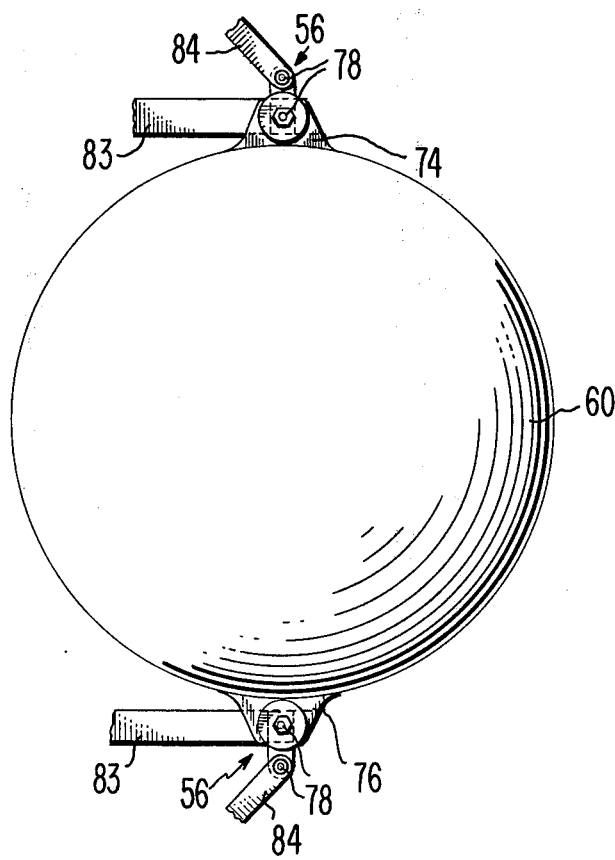

Truss members 56 and 58 are rod-like members each secured by suitable means such as pins at the terminating ends thereof as illustrated in FIG. 6. In FIG. 6, a typical fuel tank 60 is shown having two flanges 74 and 76 secured by pins 78 to truss members 56. Each rod or truss of the truss member 56 and 58 is similarly pinned to each mating connecting rod of the remaining truss. Each truss includes two identical rods 80 and two identical rods 82 (FIG. 5). Each of these rods are connected at one end to member 10 and at the other end to the corresponding fuel tanks 60 and truss member rods 84 (FIG. 4). Rods 83 and 84 are secured at one end to rods 80 and 82 and at the other end to bulkhead such as bulkhead 16. Truss members 56 and 58 provide extremely stiff support but lightweight construction for the fuel tanks 60. Truss member 58 is constructed in a similar manner as truss member 56. Truss members 56 and 58 cooperate with enclosure members 36 and 32, respectively, to provide additional shear strength under launch loads. Removal of members 32 and 36 will not alter critical positioning of the tanks to spacecraft center of gravity.

Figure 7:
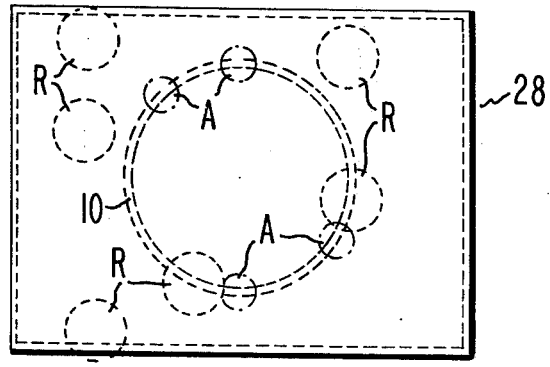
FIGS. 6, 7 and 8 are additional views of various portions of the embodiment of FIG. 1.
Figure 8:
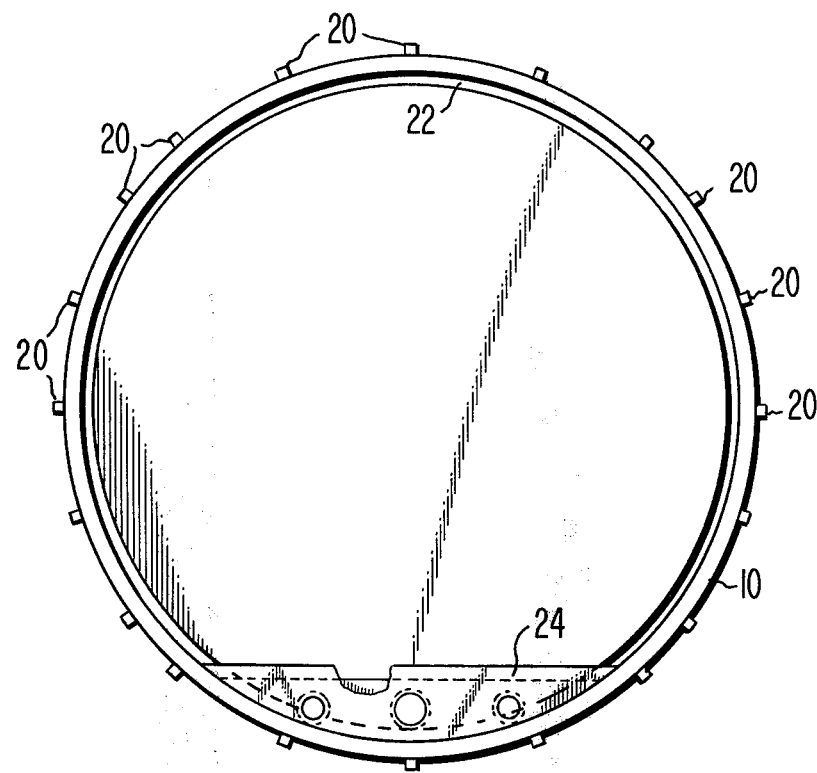

In FIG. 7 enclosure member 28 serves as a support for antenna 62 and reflector 64. The areas identified as A indicate the positions of the feet for the mounting legs of the antenna 62. The areas labeled R indicate the areas where the lighter reflector 64 is mounted. As seen, the heavier tower of antenna 62 is mounted axially in line with the structure of inner member 10. This provides extremely rigid support and precision alignment without sacrifice of weight or complexity in the antenna. FIG. 8 is a plan view showing the arrangement of the solar cell drive motor support 24. It is seen that support 24 forms a chord across the inner periphery of member 10. Rib 22 of FIG. 3a and rib 22a of FIG. 3b provide extremely rigid support for the solar cell drive motor (not shown) mounted on support 24.

Equipment may also be attached to either the bulkheads or the inner member 10 if necessary. This flexibility of mounting location within the box confines (rather than just to the outer panels of the box) offers great advantage in achieving dynamic and static balance of the spacecraft. It allows use of equipment weight rather than added net balance weights through judicious positioning. The ability to vary moment arm from center of gravity c. g. of the spacecraft allows a finer "tuning" of balance without penalty of added weight.

To further lighten the load, holes may be provided in selected ones or more of the bulkheads as desired. Further, additional payload equipment may be secured to any of the enclosure members 26 through 36. The honeycomb material used to construct the various enclosure members is conventional. The structure described conveniently permits an increase in both the payload weight and complexity without a complicated analytical redesign. Further, the externally removable panels formed by the enclosure members allows interchangeability of different modularized subsystems and panel combinations which may be designed to meet a variety of customer or mission requirements. Interchangeability and design flexibility can be accomplished without changing the basic structure stiffness or environment response. The structure is fully enclosed and all equipment internal to the spacecraft is protected from the effects of radiation. However, the structure provides ready access to internal subsystem equipment through easily removed panels. These panels can be removed without disturbance to critical tolerance alignments of reaction control thrusters, sensors and stabilization equipment used in a typical spacecraft. Yet the structure in a practical embodiment comprises less than six percent of the total launch weight of the spacecraft. The column structure formed by member 10 provides also an extremely firm mounting foundation for the solar array drive system where dynamic response is critical to the attitude control system of the spacecraft.

What is claimed is:

1. A spacecraft structure comprising:
an inner hollow cylindrical member, a plurality of bulkheads secured to and depending outwardly from said member, and
an outer enclosure member secured to the extended ends of said bulkheads and the ends of said inner cylindrical member to form a compartmentalized enclosed structure,
means within said cylindrical member including spacecraft engine mounting means connected to said cylindrical member for securing a spacecraft engine within said cylindrical member, said outer enclosure member including means for securing spacecraft equipment thereto and serving to provide structural rigidity to said structure while supporting said equipment.

2. The structure of claim 1 further including rod-like truss means secured to said inner member for securing a plurality of fuel tanks to said structure.

3. The spacecraft of claim 1 wherein said spacecraft equipment includes a communication antenna secured coaxial with the longitudinal axis of said inner member and a plurality of deployable solar cell array, said inner member including cell array deploying means secured thereto.

4. The spacecraft structure of claim 1 wherein said inner member includes a plurality of longitudinally extending ribs and annular ribs extending around the circumference of said inner member in a direction transverse said longitudinally extending ribs.

5. The spacecraft of claim 1 wherein said enclosure member is formed of a plurality of members, said plurality of members and said bulkheads forming a plurality of equipment storage compartments, each compartment being enclosed by at least one of said plurality of members.

6. A spacecraft structure comprising;
a hollow cylindrical inner member including a plurality of longitudinally extending stiffening ribs and a plurality of annular stiffening ribs extending in a direction transverse said longitudinally extending ribs,
a plurality of plate-like stiffening members depending from said inner member in a radial outward direction longitudinally along the outer periphery of said inner member
a plurality of enclosure plates, certain of said plates extending substantially parallel to the longitudinal axis of said inner member, each one of said certain plates being secured to one of said plate-like members and to two of the other enclosure plates,
the remaining enclosure plates extending transversely the longitudinal axis of said inner member with each one of said remaining plates being secured to each of said certain enclosure plates and to each of said plate-like stiffening members, and
means within said cylindrical member including spacecraft engine mounting means connected to said cylindrical member for securing a spacecraft engine within said cylindrical member.

* * * * *